United States Patent [19]

Somers et al.

[11] Patent Number: 6,070,394
[45] Date of Patent: Jun. 6, 2000

[54] LOWNOISE STRETCH WRAPPING PROCESS

[75] Inventors: Marc Stacey Somers, Longview; Guy Glen Luneau, Kilgore, both of Tex.

[73] Assignee: Eastman Chemical Company, Kingsport, Tenn.

[21] Appl. No.: 09/145,629

[22] Filed: Sep. 2, 1998

Related U.S. Application Data

[60] Provisional application No. 60/058,760, Sep. 12, 1997.

[51] Int. Cl.[7] ....................................................... B65B 53/00
[52] U.S. Cl. .............................. 53/441; 525/240; 525/222
[58] Field of Search ..................... 53/441, 556; 525/240, 525/222

[56] References Cited

U.S. PATENT DOCUMENTS

| | | |
|---|---|---|
| 3,700,753 | 10/1972 | Terada et al. . |
| 4,123,417 | 10/1978 | Finberg et al. . |
| 4,275,119 | 6/1981 | Weiner . |
| 4,291,092 | 9/1981 | Weiner . |
| 4,339,496 | 7/1982 | Weiner . |
| 4,339,498 | 7/1982 | Weiner . |
| 4,340,640 | 7/1982 | Weiner . |
| 4,340,641 | 7/1982 | Weiner . |
| 4,348,455 | 9/1982 | Clayton . |
| 4,367,256 | 1/1983 | Biel . |
| 4,399,180 | 8/1983 | Briggs et al. . |
| 4,418,114 | 11/1983 | Briggs et al. . |
| 4,430,457 | 2/1984 | Dobreski . |
| 4,536,549 | 8/1985 | Hattori et al. . |
| 4,542,188 | 9/1985 | van der Heijden . |
| 4,588,650 | 5/1986 | Mientus et al. . |
| 4,597,920 | 7/1986 | Golike . |
| 4,624,991 | 11/1986 | Haas . |
| 4,692,496 | 9/1987 | Bahl et al. . |
| 4,822,855 | 4/1989 | Kobayashi et al. . |
| 4,851,478 | 7/1989 | Su . |
| 4,861,834 | 8/1989 | Audureau et al. . |
| 4,871,813 | 10/1989 | Senez . |
| 4,929,681 | 5/1990 | Bahl et al. . |
| 4,985,498 | 1/1991 | Shirodkar . |
| 5,041,491 | 8/1991 | Turke et al. . |
| 5,047,468 | 9/1991 | Lee et al. . |
| 5,051,481 | 9/1991 | Taka et al. . |
| 5,085,927 | 2/1992 | Dohrer . |
| 5,087,667 | 2/1992 | Hwo . |
| 5,110,870 | 5/1992 | Fujii et al. . |
| 5,114,763 | 5/1992 | Brant et al. . |
| 5,126,398 | 6/1992 | Lee et al. . |
| 5,126,408 | 6/1992 | Rifi . |
| 5,147,936 | 9/1992 | Peszkin et al. . |
| 5,212,246 | 5/1993 | Ogale . |
| 5,218,046 | 6/1993 | Audureau et al. . |
| 5,236,963 | 8/1993 | Jacoby ..................................... 525/240 |
| 5,254,617 | 10/1993 | Isoue et al. . |
| 5,262,228 | 11/1993 | Kobyama et al. . |
| 5,328,734 | 7/1994 | Morese-Seguela et al. . |
| 5,334,428 | 8/1994 | Dobreski et al. . |
| 5,344,714 | 9/1994 | Su . |
| 5,358,792 | 10/1994 | Mehta . |
| 5,374,677 | 12/1994 | Nishio et al. . |
| 5,378,764 | 1/1995 | Benham et al. . |
| 5,397,843 | 3/1995 | Lakshmanan et al. . |
| 5,407,732 | 4/1995 | Dokurno . |
| 5,455,303 | 10/1995 | Panagopoulos, Jr. et al. . |
| 5,464,905 | 11/1995 | Tsutsui et al. . |
| 5,478,890 | 12/1995 | Shinozaki et al. . |
| 5,489,478 | 2/1996 | Audry et al. . |
| 5,561,195 | 10/1996 | Govoni et al. . |
| 5,569,693 | 10/1996 | Doshi et al. . |
| 5,617,707 | 4/1997 | Simmons .................................. 53/441 |
| 5,631,069 | 5/1997 | Wooster . |
| 5,635,262 | 6/1997 | Best . |
| 5,654,051 | 8/1997 | Andersson et al. . |
| 5,656,374 | 8/1997 | Marzola et al. . |
| 5,884,453 | 3/1999 | Ramsey et al. ............................ 53/441 |

FOREIGN PATENT DOCUMENTS

| | | |
|---|---|---|
| 1 163 067 | 3/1984 | Canada . |
| 0 109 512 | 5/1984 | European Pat. Off. . |
| WO 96 29203 | 9/1996 | WIPO . |

OTHER PUBLICATIONS

*Research Disclosure*, Jun. 1992, 33875, Amorphous Polyolefins as Tack Additives for Polyethylene Blown and Cast Film.

*Primary Examiner*—Linda Johnson
*Attorney, Agent, or Firm*—Jonathan D. Wood; Harry J. Gwinnell

[57] ABSTRACT

Disclosed herein is a stretch wrapping process wherein a roll of film is unwound and stretched, at a speed up to about 70 meters per minute, and the film is wrapped about the girth of a unitized plurality of goods, with the overlapping layers of film being held together by cling force. The film used in the present process is produced from a composition comprising about 85 to about 99 weight percent of a polymeric ethylenic containing component having a density no greater than 0.94 g/cc, and about 1 to about 15 weight percent of a propylene polymer comprising 0 to about 40 weight percent olefin comonomer units having 2 to 10 carbon atoms, and from about 60 to about 100 weight percent propylene.

24 Claims, No Drawings

LOWNOISE STRETCH WRAPPING PROCESS

CROSS REFERENCE TO RELATED APPLICATIONS

This application claims priority under 35 U.S.C. Section 119(e) to U.S. Provisional Application Ser. No. 60/058,760, filed Sep. 12, 1997. The present application is related to co-pending U.S. application Ser. Nos. 09/104,726, 09/145,452, 09/145,451, and 09/145,684.

FIELD OF THE INVENTION

The present invention relates to a stretch wrapping process. More particularly, the present invention relates to a stretch wrapping process using a particular film containing cling additives wherein the film unwinding noise level is preferably no higher than that associated with a film of the same composition except containing no cling additive.

BACKGROUND OF THE INVENTION

Stretch wrap film is used to wrap bundles of articles so that they can be handled as one unit. Stretch wrap film is typically made from linear low density polyethylene (LLDPE), low density polyethylene (LDPE), linear ultra low density polyethylene (LULDPE), ethylene vinyl acetate (EVA), or a mixture thereof. Blown film is preferable to cast film where strength is a factor. LLDPE and LULDPE have sufficient tensile strength and puncture resistance to be suitable for use in blown film applications. It is typical for stretch wrap film to be elongated 200 percent, or more, in commercial applications. Since LLDPE and LULDPE films often do not have adequate peel cling strength after being stretched 200 percent a cling additive may be added to the film.

In addition to the properties of adequately high tensile strength and adequately high peel cling strength, stretch wrap film should preferably have relatively low unwinding noise. This is important in light of the OSHA noise workplace restrictions. The high speed unwinding noise of LLDPE and LULDPE based stretch films is often above 85 decibels. U.S. Pat. No. 5,273,809 discloses that the addition of cling additives adversely affects the unwinding noise level of the resulting films. Furthermore, it is known that blown film containing a cling additive will generally have a higher noise level than cast stretch film.

In light of the above, it would be desirable to have a high speed, lower noise, stretch wrapping process for stretch cling film. It would be further desirable if such process provided lower noise level when using stretch film containing an amount of cling additive sufficient to provide high peel cling strength to the film.

SUMMARY OF THE INVENTION

The present invention is a stretch wrapping process which comprises, at a film unwinding speed of up to about 70 meters per minute, unwinding and stretching a roll of film produced from a composition comprising about 85 to about 99 weight percent based on the compositions, of a component selected from the group consisting of low density polyethylene, linear low density polyethylene, ethylene vinyl acetate copolymer, ultra low density polyethylene, and mixtures thereof, and about 1 to about 15 weight percent based on the composition of a propylene polymer comprising 0 to about 40 weight percent olefin comonomer units having 2 to 10 carbon atoms based on the polymer and from about 60 to about 100 weight percent propylene, based on the propylene polymer; and wrapping said stretched film about the girth of a unitized plurality of goods, forming at least one region wherein the stretched film is wrapped about itself, overlapping layers of the film being held together by cling force.

DETAILED DESCRIPTION OF THE INVENTION

The applicants were surprised to discover a lower noise, high speed stretch wrap process wherein cast and blown stretch film having increased cling were used. The present process requires the use of stretch wrap film formed from particular compositions comprising an ethylenic polymer and a propylene polymer. The present process is especially beneficial because it can be used with LLDPE and LULDPE blown film, which are useful in applications requiring increased puncture resistance and tensile strength.

The present process is particularly unexpected in light of U.S. Pat. No. 5,273,809 which states that the incorporation of additives to enhance cling adversely affects the unwinding noise level of films produced from such compositions.

The stretch wrapping process of the present invention comprises at a film unwinding speed up to about 70 meters per minute, unwinding and stretching a roll of specific-film. The film of the present invention comprises about 85 to about 99 weight percent of a component selected from the group consisting of low density polyethylene, linear low density polyethylene, ethylene vinyl acetate copolymer, ultra low density polyethylene, and mixtures thereof, and about 1 to about 15 weight percent propylene polymer comprising 0 to about 40 weight percent based on the polymer of an olefin comonomer unit having 2 to 10 carbon atoms and from about 60 to about 100 weight percent propylene, based on the propylene polymer. The present process further comprises wrapping the stretched film about the girth of a unitized plurality of goods, forming at least one region wherein the stretched film is wrapped about itself, with the overlapping layers of film being held together by cling force.

In the process of the present invention, the film is supplied as a roll of a continuous sheet of film. The unwinding and stretching aspect of the present process is preferably carried out simultaneously by applying a braking tension to the continuous roll of film so that the film is being continuously stretched while it is being unwound for use.

There are a variety of load overwrapping techniques which are commonly employed utilizing such stretch wrap film, including locating the pallet load to be wrapped atop a rotating platform. The particular overwrapping technique used in the process of the present invention is not critical. In a commonly used turn-table wrapping technique, the stretch wrap film is laid about the girth of a pallet load, and the pallet load is rotated on its platform. Usually the stretch wrap film, located adjacent to the rotating pallet load, is vertically positioned and the rotating platform or turntable may be operated at speeds up to about 50 revolutions per minute. At the completion of the overwrap operation, the turntable is stopped completely while the film is cut and attached to the previous layer of film. No adhesive or binder needs to be used since the film itself has enough peel cling force in its stretched condition to cling to the previously wrapped layer of film.

In the process of the present invention, the roll of film is unwound at a speed up to about 70 meters per minute, preferably about 30 to about 60 meters per minute. In the turn-table style spin wrapping technique disclosed above, the rotational velocity of the turn-table upon which sits the articles to be wrapped, and the amount of braking tension on the film roll, determine the speed at which the film is unwound. In the process of the present invention, the unwinding noise is preferably not greater than the unwinding noise of film having no cling additive. The film unwinding noise is preferably less than about 85 decibels, more preferably less than about 80 decibels.

In the process of the present invention, the particular stretch film used is critical for providing the combination of high peel cling strength and low unwinding noise. The film is formed directly from a composition wherein the ethylenic component comprises about 85 to about 99 weight percent of the composition, and a propylene polymer comprises about 1 to about 15 weight percent of the composition. The ethylenic component can be LLDPE, LDPE, EVA, LULDPE, or mixtures thereof. The preferred composition comprises LLDPE or LULDPE since those polymers have excellent elongation, good tear resistance, good tensile strength, and good puncture resistance. A minor amount of other film-forming polyolefins, may be present in the compositions of the present invention. More preferably the composition comprises about 90 to about 99 weight percent ethylene component and from about 1 to about 10 weight percent propylene polymer, based on the composition.

The ethylene containing polymeric component is a homopolymer of ethylene or a copolymer of ethylene with a comonomer copolymerizable therewith. More particularly, the ethylene containing polymeric component is selected from a homopolymer of ethylene, an ethylene alpha olefin copolymer, an ethylene vinyl acetate copolymer, and mixtures thereof, wherein the ethylene containing polymeric component has a density no greater than 0.94 g/cc. The ethylene containing polymeric component preferably has a density of from about 0.88 to about 0.93 g/cc, and more preferably from about 0.89 to about 0.92 g/cc.

The alpha olefin comonomer of the ethylene alpha olefin copolymer preferably has from 3 to 20 carbon atoms per molecule and is present in an amount of from about 2 to about 20 weight percent based on the ethylene alpha-olefin copolymer. Examples of the alpha olefin comonomer include 1-butene, 1-pentene, 4-methyl-1-pentene, 1-hexene, 1-octene, 1-nonene, 1-decene, 1-dodecene, a terpolymer of ethylene, a terpolymer of 1-butene, a terpolymer of 1-hexene, and mixtures and derivatives thereof. In a preferred embodiment the alpha olefin is selected from 1-butene, 1-hexene and 1-octene.

The ethylene containing polymeric component may be prepared readily by any conventional technique known in the art.

Stretch wrap film made from blown film processes is generally stronger than film made from casting. Since LDPE and EVA films are not as strong as LLDPE films, the preferred ethylenic component of the present invention is LLDPE. LLDPE has excellent elongation, good tear resistance, good tensile strength, and good puncture resistance. LLDPE is a copolymer of ethylene and an alpha olefin with density of from about 0.88 g/cm$^3$ to about 0.94 g/cm$^3$ and a melt index of about 0.4 to about 8 g/10 min. The LLDPE used is more preferably an ethylene-octene or ethylene-hexene LLDPE copolymer. The presence of up to about 20 weight percent LDPE, along with the LLDPE, improves processability, bubble stability, and optical properties. A minor amount of other polyolefins may be present in the ethylenic component.

The propylene polymer used as the cling additive is a polypropylene homopolymer or propylene copolymer comprising 0 to about 40 weight percent. C2 to C10 olefin comonomer unit content based on the polymer and from about 60 to about 100 percent by weight propylene, based on the polymer. The propylene polymer preferably has 0 to about 20 weight percent comonomer content, based on the polymer, and from about 80 to about 100 weight percent propylene, based on the polymer. The olefin comonomer units are preferably ethylene units.

The propylene polymer of the present invention can be partially crystalline or totally amorphous. The propylene polymer preferably has a needle penetration of about 5 to about 300 dmm, determined by modified ASTM (test method modified to 23° C., instead of 25° C.). The propylene polymer more preferably has a needle penetration of about 5 to about 150 dmm at 23° C. with about 5 to about 100 dmm at 23° C. being still more preferable.

The propylene polymer of the film of the present invention preferably has a Brookfield Thermosel viscosity range of from about 1 to about 30,000 mPa.s at 190° C. Preferably, the viscosity ranges from about 1 to about 10,000 mPa.s, at 190° C. The viscosity is more preferably from about 1 to about 5,000 mPa.s, at 190° C., with about 1 to about 3,000 mPa.s, at 190° C. being more preferred.

Some of the propylene polymer components of the composition utilized herein may be produced by a process disclosed in Canadian Patent 129648, entitled "Process for the Direct Synthesis of Highly Amorphous Propylene Homopolymers and Propylene—Ethylene Copolymers." Propylene copolymer components within the scope of the present invention may also be purchased from Eastman Chemical Company, Kingsport, Tenn. under the Eastman Chemical Company Trademark, EASTOFLEX.

The exact amounts of the ethylene containing polymeric component and the propylene polymer component of the compositions herein are determined by the application for which film produced therefrom is to be employed. Variation of the amounts of each component is within the scope of one skilled in the art.

For many purposes, it may be desirable to incorporate other conventional additives with the compositions of the present invention. For example, there may be added antioxidants, heat and light stabilizers, dyes, antistatic agents, preservatives, processing aids, pigments, flame retardants, and the like.

The compositions of the ethylene containing polymeric component defined hereinabove and the propylene polymer defined hereinabove are readily prepared by any method known in the art. For example, the components of the compositions may be blended together by melt extrusion or may be admixed together on a conventional mixing machine such as an extruder or a continuous mixer.

The compositions of the invention can be formed into stretch wrap film using any technique known in the art such as a cast method or blown film method. The present invention preferably includes a blown film process wherein an extruder having an annular die is used for extruding the composition of the present invention. Air is blown in through the extruder die to form a bubble of the present polymer blend having a blow-up ratio of 1 to 3.5 times the die diameter. After a cooling air stream cures the film, the film is wound onto rolls. More particularly, a composition as defined hereinabove is introduced into the feed hopper of an extruder that is water-cooled and resistance heated. The films were produced using an annular die with about a 2.24 mm die gap, along with a dual orifice nonrotating, nonadjustable air ring. The film is extruded through the die into a film that is cooled by blowing air onto the surface of the film in a blowing manner. The film is drawn from the die typically forming a cylindrical film that is cooled, collapsed, optionally slit, and wound to form a roll of film. In preparing cast film, any of the well known cast film forming procedures may be utilized.

The film of the present invention has a good peel cling strength. It is now commonplace for stretch wrap film to be elongated to 200 percent and higher, during a stretch wrapping process. Peel cling strength generally decreases with more elongation. Therefore, it is important to determine that the peel cling strength of a film be adequate when elongated, instead of being measured only when unstretched, as has been past practice. At 200 percent elongation, the film of the present invention preferably has a peel cling strength of about 100 to about 500 g/2.54 cm, preferably about 100 to about 400 g/2.54 cm, with about 100 to about 300 g/2.54 cm being more preferable, determined using ASTM Method D5458-95 "Standard Test Method for Peel Cling of Stretch Wrap Film" at 2 weeks after film formation.

The film of the process of the present invention is preferably about 0.010 to about 0.051 mm thick. More preferably, the film is about 0.010 to about 0.038 mm thick, with about 0.010 to about 0.025 mm being the most preferred thickness. The film can be either a monolayer film or a multilayer film.

The invention will be more readily understood by reference to the following examples. There are, of course, many other forms of the invention which will become obvious to one skilled in the art, once the invention has been fully disclosed, and it will be accordingly be recognized that these examples are given for the purpose of illustration only, and are not to be construed as limiting the scope of this invention in any way.

EXAMPLES

The following test procedures were used in evaluating the analytical properties of the compositions herein and in evaluating the physical properties of the films of the examples.

Cling values were obtained in accordance with ASTM D5458-95 entitled "Standard Test Method for Peel Cling of Stretch Wrap Film."

Noise level in decibels, dB, was measured by unwinding the film rolls at speeds of about 20 m/min. to about 70 m/minute. A digital sound meter was used to measure the level of sound generated by the film roll while unwinding.

Viscosity—ASTM D3236 (at 190° C.)

Needle Penetration—ASTM Test for Needle Penetration (at 23° C.)

Melt index—ASTM D 1238 (at 190° C.)

Density—ASTM D4888

Example 1

Normal turntable type stretch wrap machines unwind film rolls at relatively low speeds. The unwind speed of a roll of stretch film on a LANTECH LAN-WRAPPER was measured at about 42 rpm (about 20 m/min). It is estimated that high speed "arm" stretch wrap machines operate at about twice this speed (about 40 m/min). This example shows the unexpected benefit of the process of the present invention, using a three layer cast stretch film having skin layers within the scope of the present invention compared to a commercial three (3) layer film having skin layers outside of the present invention.

The A/B/A film of the present example was made as follows. A composition comprising a blend of 3 weight percent EASTOFLEX P1023 propylene homopolymer, available from Eastman Chemcial Company and having typical properties of a Brookfield Thermosel viscosity of 2,250 mPa.s at 190° C., and a needle penetration hardness of 20 dmm at 23° C., and 97 weight percent LLDPE having a density of about 0.917 g/cm$^3$ and a melt index of about 2.3 g/10 min was used to make the skin layers of the film. The core layer was an LLDPE having a density of about 0.917 g/cm$^3$ and a melt index of about 2.3 g/10 min.

This film was compared to a commonly used ANB/A cast film having skin layers formed from a composition comprising a blend of two different LULDPE products. The LULDPE blend comprises about 80% octene-LULDPE having a density of about 0.915 g/cm$^3$ and a melt index of about 3.3 g/10 min., and about 20% octene-LULDPE resin having a density of about 0.904 g/cm$^3$ and a melt index of about 4.0 g/10 min. The core layer was an hexene-LLDPE resin having a density of about 0.917 g/cm$^3$ and a melt index of about 2.3 g/10 min.

The cast films were made on commercial stretch film equipment and are A/B/A film structures, with the A-Layers comprising about 15% by weight of the total film structure (about 7.5% each) and the core layer comprising about 85% by weight of the total film structure. The films were about 0.0006 inches (0.015 mm) in thickness.

Table 1 shows unwinding noise and peel cling data on the above described films. Noise data were measured by a decibel meter and maximum noise levels were recorded. The film roll unwinding speed was measured at about 90 rpm (about 39 m/min.). The equipment used to unwind the film was measured a s having a maximum noise level of 71 decibels (dB) when running without film on the rollers.

TABLE 1

| Film Property | LULDPE Blend Skins | 3% Propylene-Homopolymer in LLDPE Skins |
|---|---|---|
| Unelongated Peel Cling, g/2.54 cm | 170 | 323 |
| Elongated Peel Cling, g/2.54 cm | 109 | 225 |
| Max. Unwinding Noise, dB | 86 | 72 |

The data in Table 1 shows the beneficial and unexpected results of the process of the present invention. The comparison is made of the use of a film of the present invention as a skin layer of a multilayer stretch film with a film produced from neat LULDPE containing no propylene polymer. As shown, when using the process of the present invention, the film produced from the composition of LLDPE and propylene homopolymer has increased peel cling values as compared to the film produced from neat LULDPE, both in the unelongated and elongated conditions. Moreover, as is further evident from the data, the increase in cling value was achieved with no accompanying increase in noise level, and in fact, with a decrease in noise level. Accordingly, using the process of the present invention, the film had the unexpected combination of higher peel cling levels and lower unwinding noise, at high unwinding speed. This is completely unexpected in that the prior art, as typified by U.S. Pat. No. 5,273,809, indicates that the incorporation of additives to enhance peel cling adversely affects the unwind noise level of films produced therefrom.

Example 2

Normal turntable type stretch wrap machines unwind film rolls at relatively low speeds. The unwind speed of a roll of stretch film on a LANTECH LAN-WRAPPER was measured at about 42 rpm (about 20 m/min.). It is estimated that high speed "arm" stretch wrap machines operate at about twice this speed (about 40 m/min).

This example will show the unexpectedly low noise level of the process of the present invention using as skin layers blown hexene-LULDPE stretch film containing propylene homopolymer having a Brookfield Thermosel viscosity of 180 mPa.s at 190° C., and a needle penetration hardness of about 24 dmm at 23° C. The propylene homopolymer was added to two LULDPE products ranging in density from about 0.906 g/cm$^3$ to about 0.910 g/cm$^3$ and having a melt index from about 0.5 g/10 min. to about 0.9 g/10 min. The film used for comparison had skin layers of neat LULDPE (containing no cling additive).

All films in this example were three layer A/B/A films that contained a hexene-LLDPE core layer having a density of about 0.920 g/cm$^3$ and a melt index of about 0.9 g/10 min. The 0.001 inch (0.025 mm) thick blown films were made with a blow-up ratio of about 2.4:1 at about 60 feet/minute (18.3 m/minute). The film structures were A/B/A with the core layer (B Layer) comprising 80% by weight of the entire structure. The skin layers (A Layers) each comprised about 10% by weight of the film structure (about 20% by weight total).

The film unwinding noise and peel cling values of two films were compared and are shown in Tables 2 and 3. Noise data were measured by a decibel meter and maximum noise levels were recorded. The film roll unwinding speed was measured at about 60 rpm (about 41 m/min). The equipment used to unwind the film was measured having a maximum noise of 71 decibels (dB) when running without film on the rollers (same equipment used in Example 1).

TABLE 2

0.5 g/10 min. Melt Index, 0.906 Density LULDPE Skin Layer Films

| Film Property | LULDPE Skins No Propylene Polymer | 8% Propylene Polymer in LULDPE Skins |
|---|---|---|
| Unelongated Peel Cling, g/2.54 cm | 0 | 445 |
| Elongated Peel Cling, g/2.54 cm | 0 | 187 |
| Max. Film Unwinding Noise, dB | 84 | 79 |

TABLE 3

0.9 g/10 min. Melt Index, 0.910 Density LULDPE Skin Layer Films

| Film Property | LULDPE Skins No Propylene Polymer | 8% Propylene Polymer in LULDPE Skins |
|---|---|---|
| Unelongated Peel Cling, g/2.54 cm | 172 | 745 |
| Elongated Peel Cling, g/2.54 cm | 0 | 153 |
| Max. Film Unwinding Noise, dB | 78 | 77 |

The peel cling values were measured 2 weeks after the films were produced. The data shows the benefit of the process of the present invention wherein LULDPE film containing the propylene homopolymer of the present invention is used as the skin layer of stretch film in comparison with neat LULDPE. Using the present process, the film had higher peel cling in combination with lower unwinding noise at high unwinding speeds.

As in Example 1, the films produced by the process of the present invention are characterized by properties that are both advantageous and contrary to the teachings of the prior art. Unexpectedly, the increase in peel cling was achieved with no accompanying increase in noise level, and in fact, with a decrease in noise level. Generally, films containing peel cling additives are characterized by having increased noise levels.

It should be clearly understood that the forms of the invention herein described are illustrative only and are not intended to limit the scope of the invention. The present invention includes all modifications falling within the scope of the following claims.

I claim:

1. A stretch wrapping process comprising:
   (a) at a film unwinding speed of from about 30 to about 70 meters per minute, unwinding and stretching a roll of film comprising:
      (1) about 85 to about 99 weight percent, based on the total weight of the composition, of a component selected from a homopolymer of ethylene, an ethylene alpha olefin copolymer, an ethylene vinyl acetate copolymer, and mixtures thereof, wherein the component has a density no greater than 0.94 g/cc; and
      (2) about 1 to about 15 weight percent, based on the total weight of the composition, of a propylene polymer comprising 0 to about 40 weight percent based on the polymer of an olefin comonomer unit having 2 to 10 carbon atoms and from about 60 to about 100 weight percent propylene, based on the polymer, and
   (b) wrapping the resulting stretched film about the girth of a unitized plurality of goods, forming at least one region wherein the stretched film is wrapped about itself, overlapping layers of the film being held together by cling force wherein the process is further characterized by having a film unwinding noise level no greater than that of a film comprising the component of (1) in the absence of the propylene polymer of (2).

2. The process according to claim 1 wherein the film unwinding speed ranges from about 30 to about 60 meters per minute.

3. The process according to claim 1 wherein the component has a density of from about 0.88 to about 0.93 g/cc.

4. The process according to claim 1 wherein the component is an ethylene alpha olefin copolymer wherein the alpha olefin comonomer has from 3 to 20 carbon atoms and is present in an amount of from about 2 to about 20 weight percent based on the ethylene alpha olefin copolymer.

5. The process according to claim 4 wherein the alpha olefin comonomer is selected from 1-butene, 1-hexene, and 1-octene.

6. The process according to claim 1 wherein the olefin comonomer units of the propylene polymer are ethylene units.

7. The process according to claim 1 wherein the propylene polymer comprises 0 to about 20 weight percent olefin comonomer units, and from about 80 to about 100 weight percent propylene.

8. The process according to claim 1 wherein the propylene polymer is polypropylene homopolymer.

9. The process according to claim 1 wherein the propylene polymer has a Brookfield Thermosel viscosity of about 1 to about 30,000 mPa.s at 190° C.

10. The process according to claim 9 wherein the propylene polymer has a Brookfield Thermosel viscosity of about 1 to about 10,000 mPa.s at 190° C.

11. The process according to claim 10 wherein the propylene polymer has a Brookfield Thermosel viscosity of about 1 to about 5,000 mPa.s at 190° C.

12. The process according to claim 11 wherein the propylene polymer has a Brookfield Thermosel viscosity of about 1 to about 3,000 mPa.s at 190° C.

13. The process according to claim 1 wherein the propylene polymer has a needle penetration hardness of about 5 to about 300 dmm at 23° C., determined according to ASTM.

14. The process according to claim 13 wherein the propylene polymer has a needle penetration hardness of about 5 to about 150 dmm at 23° C.

15. The process according to claim 14 wherein the propylene polymer has a needle penetration hardness of about 5 to about 100 dmm at 23° C.

16. The process according to claim 1 wherein the film is about 0.010 to about 0.051 mm thick.

17. The process according to claim 16 wherein the film is about 0.010 to about 0.038 mm thick.

18. The process according to claim 17 wherein the film is about 0.010 to about 0.025 mm thick.

19. The process according to claim 1 wherein the film is a monolayer film.

20. The process according to claim 1 wherein the film is a multilayer film.

21. The process according to claim 1 wherein the film has a peel cling strength at 200 percent elongation of about 100 to about 500 g/2.54 cm, determined according to ASTM D5458-95 at two weeks after film formation.

22. The process according to claim 1 wherein the film is stretched to about 200 percent elongation.

23. The process according to claim 1 wherein the film is a blown film.

24. The process according to claim 1 where the film is a cast film.

* * * * *